United States Patent
Morin et al.

(10) Patent No.: US 11,734,772 B2
(45) Date of Patent: *Aug. 22, 2023

(54) SYSTEM AND METHOD FOR PROVIDING A PREDICTED TAX REFUND RANGE BASED ON PROBABILISTIC CALCULATION

(71) Applicant: Intuit Inc., Mountain View, CA (US)

(72) Inventors: Yao H. Morin, San Diego, CA (US); Massimo Mascaro, San Diego, CA (US); R. Jason Char, San Diego, CA (US); Carol Ann Howe, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/113,994

(22) Filed: Dec. 7, 2020

(65) Prior Publication Data

US 2021/0090181 A1 Mar. 25, 2021

Related U.S. Application Data

(63) Continuation of application No. 15/455,487, filed on Mar. 10, 2017, now Pat. No. 10,943,309.

(51) Int. Cl.
*G06Q 40/00* (2023.01)
*G06Q 40/12* (2023.01)
*G06N 5/04* (2023.01)

(52) U.S. Cl.
CPC ............. *G06Q 40/123* (2013.12); *G06N 5/04* (2013.01)

(58) Field of Classification Search
CPC .................................................. G06Q 40/123
See application file for complete search history.

(56) References Cited

U.S. PATENT DOCUMENTS

| | | | |
|---|---|---|---|
| 4,763,277 | A | 8/1988 | Ashford et al. |
| 6,327,574 | B1 | 12/2001 | Kramer et al. |
| 6,922,488 | B2 | 7/2005 | Mastrianni et al. |
| 6,973,418 | B1 | 12/2005 | Kirshenbaum |

(Continued)

FOREIGN PATENT DOCUMENTS

| WO | WO2006058207 A2 | 6/2006 |
|---|---|---|
| WO | WO2916039779 A1 | 3/2016 |

OTHER PUBLICATIONS

Wikipedia, "A/B Testing," Wikipedia, Apr. 7, 2016 <URL: https://en.wikipedia.org/w/index.php?title=A/B_testing&oldid=714022348>, retrieved Apr. 22, 2021, 7-pages.

(Continued)

*Primary Examiner* — Jessica Lemieux
(74) *Attorney, Agent, or Firm* — Paradice & Li LLP

(57) ABSTRACT

A method and system provide estimated tax refund data to a user of a tax return preparation system throughout personalized tax return preparation interview. The method and system receive current user tax related data associated with the user, retrieve tax rules data, and gather historical tax related data associated with historical users of the tax return preparation system. The method and system further generate probabilistic inference data including inferences about tax related characteristics of the user based on the historical tax related data and the tax rules data. The method and system provide estimated tax refund data to the user based on the probabilistic inference data.

20 Claims, 4 Drawing Sheets

(56) References Cited

U.S. PATENT DOCUMENTS

| | | |
|---|---|---|
| 7,716,094 B1 | 5/2010 | Sutter et al. |
| 7,769,647 B1* | 8/2010 | Char ................ G06Q 40/02 |
| | | 705/30 |
| 7,788,137 B1 | 8/2010 | Tifford |
| 7,788,204 B1 | 8/2010 | Thomas |
| 7,797,166 B1 | 9/2010 | Bradley et al. |
| 7,860,763 B1 | 12/2010 | Quinn et al. |
| 7,917,411 B1 | 3/2011 | Bedell |
| 8,024,660 B1 | 9/2011 | Quinn et al. |
| 8,090,794 B1 | 1/2012 | Kilat et al. |
| 8,099,309 B1 | 1/2012 | Bober |
| 8,190,499 B1 | 5/2012 | McVickar |
| 8,200,527 B1 | 6/2012 | Thompson et al. |
| 8,346,635 B1 | 1/2013 | Olim |
| 8,407,113 B1 | 3/2013 | Eftekhari et al. |
| 8,452,676 B1 | 5/2013 | Talan et al. |
| 8,490,018 B2 | 7/2013 | Carter et al. |
| 8,706,762 B1 | 4/2014 | Patzer et al. |
| 8,768,313 B2 | 7/2014 | Rodriguez |
| 8,775,070 B1 | 7/2014 | Bhatia |
| 8,806,444 B1 | 8/2014 | Podgorny et al. |
| 8,909,568 B1 | 12/2014 | Mann et al. |
| 9,128,911 B1* | 9/2015 | Howe ................ G06Q 40/10 |
| 9,355,650 B2 | 5/2016 | Dimitriadis et al. |
| 9,378,065 B2 | 6/2016 | Shear et al. |
| 9,442,827 B2 | 9/2016 | Mascaro et al. |
| 9,444,824 B1 | 9/2016 | Balazs et al. |
| 9,484,044 B1 | 11/2016 | Mascaro et al. |
| 9,530,434 B1 | 12/2016 | Mascaro et al. |
| 9,648,171 B1 | 5/2017 | Eftekhari et al. |
| 9,870,785 B2 | 1/2018 | Bradley et al. |
| 9,891,792 B1 | 2/2018 | Morin et al. |
| 9,922,668 B2 | 3/2018 | Bradley et al. |
| 9,983,859 B2 | 5/2018 | Mascaro et al. |
| 9,990,544 B1 | 6/2018 | Uribe et al. |
| 10,013,721 B1 | 7/2018 | Laaser et al. |
| 10,096,072 B1 | 10/2018 | Ali et al. |
| 10,162,734 B1 | 12/2018 | Podgorny et al. |
| 10,169,828 B1 | 1/2019 | Morin et al. |
| 10,176,534 B1 | 1/2019 | Mascaro et al. |
| 10,204,382 B2 | 2/2019 | Morin et al. |
| 10,943,309 B1 | 3/2021 | Morin et al. |
| 11,030,631 B1 | 6/2021 | Mascaro et al. |
| 11,069,001 B1 | 7/2021 | Mascaro et al. |
| 2002/0152457 A1 | 10/2002 | Jahnke |
| 2003/0028451 A1 | 2/2003 | Ananian |
| 2003/0144868 A1 | 7/2003 | MacIntyre et al. |
| 2006/0112114 A1 | 5/2006 | Yu et al. |
| 2006/0143093 A1 | 6/2006 | Brandt et al. |
| 2006/0155632 A1 | 7/2006 | Cherkas et al. |
| 2006/0294084 A1 | 12/2006 | Patel et al. |
| 2007/0100679 A1 | 5/2007 | Wollan et al. |
| 2007/0192166 A1 | 8/2007 | Van Luchene |
| 2007/0239518 A1 | 10/2007 | Chung et al. |
| 2007/0260596 A1 | 11/2007 | Koran et al. |
| 2008/0071703 A1 | 3/2008 | Evans |
| 2008/0077462 A1 | 3/2008 | Patel et al. |
| 2008/0127127 A1 | 5/2008 | Chitgupakar et al. |
| 2008/0147494 A1 | 6/2008 | Larson |
| 2009/0089141 A1 | 4/2009 | Lara et al. |
| 2009/0106178 A1 | 4/2009 | Cha |
| 2009/0132368 A1 | 5/2009 | Cotter et al. |
| 2009/0313086 A1 | 12/2009 | Lee et al. |
| 2011/0071975 A1* | 3/2011 | Friedlander ....... G06F 16/24565 |
| | | 706/47 |
| 2011/0243553 A1 | 10/2011 | Russell |
| 2011/0264569 A1 | 10/2011 | Houseworth et al. |
| 2011/0288868 A1 | 11/2011 | Lloyd et al. |
| 2011/0296401 A1 | 12/2011 | DePoy |
| 2012/0030079 A1 | 2/2012 | Slater et al. |
| 2012/0030080 A1 | 2/2012 | Slater et al. |
| 2012/0109792 A1 | 5/2012 | Eftekhari et al. |
| 2012/0150888 A1 | 6/2012 | Hyatt et al. |
| 2012/0215669 A1 | 8/2012 | Lieberman et al. |
| 2012/0303559 A1 | 11/2012 | Dolan |
| 2013/0080911 A1 | 3/2013 | Klemm |
| 2013/0088650 A1 | 4/2013 | Rouady et al. |
| 2013/0159228 A1 | 6/2013 | Meijer et al. |
| 2013/0198047 A1 | 8/2013 | Houseworth et al. |
| 2013/0268468 A1 | 10/2013 | Vijayaraghavan et al. |
| 2013/0282539 A1 | 10/2013 | Vijayaraghavan et al. |
| 2014/0067518 A1 | 3/2014 | McGovern |
| 2014/0068407 A1 | 3/2014 | Suh et al. |
| 2014/0068600 A1 | 3/2014 | Ashok et al. |
| 2014/0075336 A1 | 3/2014 | Curtis et al. |
| 2014/0122381 A1 | 5/2014 | Nowozin |
| 2014/0156681 A1 | 6/2014 | Lee et al. |
| 2014/0201045 A1 | 7/2014 | Pai et al. |
| 2014/0359261 A1 | 12/2014 | Collins et al. |
| 2015/0039297 A1 | 2/2015 | Greer et al. |
| 2015/0112826 A1 | 4/2015 | Crutchfield, Jr. |
| 2015/0205842 A1 | 7/2015 | Jain et al. |
| 2015/0220604 A1 | 8/2015 | Bunnell |
| 2015/0227962 A1 | 8/2015 | Wical et al. |
| 2015/0254675 A1 | 9/2015 | Kannan et al. |
| 2016/0012350 A1 | 1/2016 | Narayanan et al. |
| 2016/0063645 A1 | 3/2016 | Houseworth et al. |
| 2016/0078471 A1 | 3/2016 | Hamedi |
| 2016/0078567 A1 | 3/2016 | Goldman et al. |
| 2016/0098804 A1 | 4/2016 | Mascaro et al. |
| 2016/0103667 A1 | 4/2016 | Chen et al. |
| 2016/0148321 A1 | 5/2016 | Claramitaro et al. |
| 2016/0180470 A1 | 6/2016 | Mascaro et al. |
| 2016/0180484 A1 | 6/2016 | Roebuck |
| 2016/0217534 A1 | 7/2016 | Goldman et al. |
| 2016/0247239 A1 | 8/2016 | Houseworth et al. |
| 2016/0267397 A1 | 9/2016 | Carlsson |
| 2016/0335674 A1 | 11/2016 | Plourde |
| 2016/0342911 A1 | 11/2016 | Kannan et al. |
| 2016/0350870 A1 | 12/2016 | Morin et al. |
| 2017/0004422 A1 | 1/2017 | Todd et al. |
| 2017/0090893 A1 | 3/2017 | Aditya et al. |
| 2017/0103439 A1 | 4/2017 | Kolb et al. |
| 2017/0178199 A1 | 6/2017 | Cessna et al. |
| 2017/0186097 A1 | 6/2017 | Mascaro et al. |
| 2017/0193546 A1 | 7/2017 | Bennett et al. |
| 2017/0195488 A1 | 7/2017 | Pendyala et al. |
| 2017/0200087 A1 | 7/2017 | Mascaro et al. |
| 2017/0220943 A1 | 8/2017 | Duncan et al. |
| 2017/0236131 A1 | 8/2017 | Nathenson et al. |
| 2017/0270526 A1 | 9/2017 | Fitzgerald |
| 2017/0300933 A1 | 10/2017 | Mascaro et al. |
| 2017/0308960 A1 | 10/2017 | Mascaro et al. |
| 2017/0315791 A1 | 11/2017 | Mascaro et al. |

OTHER PUBLICATIONS

Agrawal et al., "Thompson Sampling for Contextual Bandits with Linear Payoffs," Proceedings of the 30th International Conference on Machine Learning, Atlanta, Georgia, USA, JMLR: W&CP, vol. 28, 2013, 9-pages.

Araujo et al., "Ensemble Forecasting of Species Distributions," ScienceDirect Trends in Ecology and Evolution, vol. 22, No. 1, Sep. 29, 2006, pp. 42-47.

Armbrust et al., "Scaling Spark in the Real World," Proceedings of the VLDB Endowment; [ACM Digital Library], Association of Computing Machinery, New York, NY, vol. 8, No. 12, pp. 1840-1843, Aug. 1, 2015.

Bell et al., "The Use of Multi-Criteria Decision-Making Methods in the Integrated Assessment of Climate Change: Implications for IA Practitioners," Socio-Economic Planning Sciences, vol. 37, Issue 4, Dec. 2003, pp. 289-316, Elsevier Science Ltd.

Breuker, "Towards Model-Driven Engineering for Big Data Analytics—An Exploratory Analysis of Domain-Specific Languages for Machine Learning," 2014 47th Hawaii International Conference on System Sciences, IEEE, pp. 758-767, Jan. 6, 2014.

Chan et al., "PredictionIO: A Distributed Machine Learning Server for Practical Software Development," Proceedings of the 22nd ACM International Conference on Information & Knowledge Management, CIKM '13, pp. 2493-2496, Nov. 2013.

(56) References Cited

OTHER PUBLICATIONS

Hoeting et al., "Bayesian Model Averaging," Technical Report 335, Department of Statistics, University of Washington, May 28, 1998, 40 pages.

Irsoy et al., "Budding Trees," 22nd International Conference on Pattern Recognition, 2014, pp. 3582-3587.

Lee et al., The Internet of Things (IoT): Applications, Investments, and Challenges for Enterprises, Business Horizons, vol. 58, issue 4, Jul.-Aug. 2015, pp. 431-440, Elsevier Inc.

Poyarkov et al., "Boosted Decision Tree Regression Adjustment for Variance Reduction in Online Controlled Experiments," KDD '16 Proceedings of the 22nd ACM SIGKDD International Converence on Knowledge Discovery Data Mining, pp. 235-244, ACM Digital Library, 2016.

Rokach et al., "Top-Down Induction of Decision Trees Classifiers—A Survey," IEEE Transactions on Systems, Man, and Cybernetics—Part C: Applications and Reviews. vol. 35, No. 4, Nov. 2005, pp. 476-487.

Said, Jeremy, "Why Segmentation is the Key to Any AB Testing Strategy," first published on Jul. 22, 2014. Source: Wayback Machine at https://www.jeremysaid.com/blog/segmentation-secret-ab-testing-strategy, 8-pages.

Zaharia et al., "Resilient Distributed Datasets: A Fault-Tolerant Abstraction for In-Memory Cluster Computing," USENIX, USENIX, The Advanced Computer Systems Association, pp. 1-14, Apr. 11, 2013.

Zhang et al., "Enabling Personalization Recommendation with WeightedFP for Text Information Retrieval Based on User-Focus," Proceedings of the International Conference on Information Technology: Coding and Computing (ITCC'04), 5 pages, 2004.

* cited by examiner

SYSTEM AND METHOD FOR PROVIDING A PREDICTED TAX REFUND RANGE BASED ON PROBABILISTIC CALCULATION

CROSS-REFERENCE TO RELATED APPLICATION

This Patent Application is a continuation of and claims priority to U.S. patent application Ser. No. 15/455,487 entitled "SYSTEM AND METHOD FOR PROVIDING A PREDICTED TAX REFUND RANGE BASED ON PROBABILISTIC CALCULATION" filed on Mar. 10, 2017, now U.S. Pat. No. 10,943,309, which is assigned to the assignee hereof. The disclosures of all prior Applications are considered part of and are incorporated by reference in this Patent Application in their respective.

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a highly accessible and affordable source of tax preparation assistance. However, traditional tax return preparation systems are typically static and inflexible and provide a tax return preparation process that is the same for each user.

For example, some traditional tax return preparation systems provide an estimated tax refund to the user during the tax return preparation interview. As the user enters data during the tax return preparation interview, the estimated tax refund can undergo large changes. The estimated tax refund may initially be large, before being changed to a large tax liability as further data is entered by the user. These large changes throughout the tax return preparation interview can be confusing and discouraging to the user. Additionally, if the user is expecting a large tax refund, but the initial estimated tax refund at the beginning of the tax return preparation interview indicates an expected tax liability, or a smaller than expected refund, then the user can lose confidence in the tax return preparation system at the beginning of the tax return preparation process. Such problems may cause the user to lose faith in the traditional tax return preparation system and cause the user to decide to forgo the use of the traditional tax return preparation system in favor of other tax return preparation options.

Consequently, there is a long standing technical problem in the tax return preparation system arts in the form of a need to provide personalized electronic financial management services to users.

SUMMARY

Embodiments of the present disclosure provide technical solutions to problems associated with traditional electronic tax return preparation systems by providing methods and systems for combining tax rules with probability based inferences to present an estimated tax refund to a user during a tax return preparation interview. Embodiments of the present disclosure combine rules-based tax return preparation techniques with probabilistic inferences in order to present estimated tax refund data to a user during a tax return preparation interview. Embodiments of the present disclosure can provide the estimated tax refund data to the user even at early stages of the tax return preparation interview when the user has provided only a small amount of data. Embodiments of the present disclosure leverage the fact that a large number of historical users have undergone tax return preparation interviews and that there exists a large amount of data related to these historical users. Embodiments of the present disclosure analyze tax rules data and the historical financial data related to these historical users in order to make probabilistic inferences about the current user in order to generate an estimated tax refund that is likely to be accurate even at early stages of the tax return preparation interview. A tax return preparation system in accordance with principles of the present disclosure overcomes many of the drawbacks of previous tax return preparation systems by presenting an estimated tax refund that is unlikely to undergo large swings as the user continues to provide data during the tax return preparation interview process. Therefore, the disclosed embodiments provide one or more technical solutions to the technical problem of electronic tax return preparation systems that do not provide a stable and accurate tax refund estimate throughout a tax return preparation interview.

In one embodiment, the tax return preparation system gathers current user tax related data from a user of the tax return preparation system during a tax return preparation interview. The current user tax related data can include data such as an age of the user, a gender of the user, an address of the user, an income of the user, employment data related to the user, tax withholding data, and other tax related information associated with the user. The tax return preparation system also gathers historical tax related data associated with historical users of the tax return preparation system. The tax return preparation system analyzes the current user tax related data and the historical tax related data in order to identify subsets of the historical users that have characteristics that are similar to the characteristics of the user as represented in the current user tax related data collected so far. The tax return preparation system can then make probability based inferences about characteristics of the user that have not yet been provided by the user. Based on these probabilistic inferences, the tax return preparation system can generate estimated tax refund data than includes a range or distribution into which the user's final tax refund amount is likely to fall.

In one embodiment, the tax rules data can include tax rules data associated with rules and procedures for electronically preparing tax returns. The tax return preparation system analyzes the tax rules data, the current user tax related data, and the historical tax returns of the historical users in order to make probabilistic inferences with regards to the data points not yet provided by the user. The tax return preparation system presents an estimated tax refund range that is unlikely to change greatly even though the user is only at the beginning of the tax return preparation interview and only a small portion of the user's tax related data has been provided to the tax return preparation system.

In one embodiment, the tax rules data can include external tax rules data. The external tax rules data can include data related to tax laws, electronic versions of tax forms, electronic versions of tax worksheets, or other data. The external tax data can be obtained from government sources or other third party sources.

In one embodiment, the tax rules data can include internal tax rules data generated and used by the tax return preparation system in order to make sense of and to make use of the external tax rules data. The internal tax rules data can include internally generated forms and worksheets. The internal tax rules data can include data related to sets of procedures, steps, and calculations relevant to the preparation of tax returns for the practically innumerable different financial circumstances of individuals and organizations that prepare tax returns. The tax rules data can include internal tax preparation data utilized by the tax return preparation system in assisting users to electronically prepare their tax returns. The tax return preparation system includes a large database of knowledge for making use of the tax laws, tax forms, and tax worksheets in assisting users to electronically prepare their tax returns. For example, the internal tax rules data includes data relating to the various internal procedures for making use of the government tax forms and for calculating correct data entries for the various lines in the various tax forms. The internal tax rules data includes data related to each line of each tax form and each worksheet. The internal tax rules data indicates the dependencies for calculating or otherwise providing data entries for each line of each tax form. During a tax return preparation interview, the tax return preparation system asks the user for certain kinds of data and then populates the various lines of the tax forms based on the user's data and the tax rules data.

In one embodiment, the tax return preparation interview uses the tax rules data, the current user tax related data that has been provided by or obtained from the user, and the historical tax related data related to previous users of the tax return preparation system in order to make probabilistic inferences regarding data that has not yet been provided by the user. For example, a government tax form may include text related to line 5 of the tax form stating "This value is the lesser of $6000 and the sum of line 3 and line 4." The tax rules data includes a specific function for generating the correct value for line 5. However, during a tax return preparation interview, the user may not yet have provided the data related to line 4. The tax return preparation system can make a probabilistic inference in order to generate a likely value or range of values for line 5 for the user even though the user has not yet provided the value for line 4. In particular, the tax return preparation system analyzes the tax rules data and identifies the various dependencies for generating the correct value for line 5 and identifies that the value for line 4 is needed. The tax return preparation system accesses historical tax related data, identifies historical users that are similar to the current user, retrieves the values for line 4 related to the historical users, and makes a probabilistic inference as to the likely value of line 5 for the user based on the values for line 4 related to the historical users. The tax return preparation interview can utilize many such inferences in generating an estimated tax refund. In this way, the tax return preparation system can utilize tax rules data, historical tax related data, and current user tax related data in order to make probabilistic inferences about the user and to generate an estimated tax refund for the user.

Principles of the present disclosure can be extended to financial management systems other than tax return preparation systems. In one embodiment, principles of the present disclosure can be utilized by a financial management system that assists users in preparing or managing one or more of investments, banking, loans, retirement plans, credit cards, budgeting, or other financial matters. The financial management system can assist the user in preparing financial documents related to one or more financial matters. The financial management system can utilize financial rules data including external financial rules data such as financial laws, financial forms, financial worksheets, etc. The financial rules data can include internal financial rules data related to procedures for filling out the financial forms or worksheets. The financial management system can utilize the financial rules data in making probabilistic inferences about a current user of the financial return preparation system in order to better provide financial management services to the user.

In one embodiment, the tax return preparation system generates the estimated tax refund data based on the tax refunds of historical users as indicated by the historical tax related data. The tax return preparation engine can identify a subset of the historical users having characteristics similar to those of the current user. The tax return preparation engine can identify a range into which the tax refunds from the historical tax returns fall. Tax return preparation engine can further calculate a range into which the tax refund of the user is most likely to fall. The tax return preparation engine can provide to the user estimated tax refund data that includes a range into which the tax refund of the user is likely to fall. As the user enters further data, the tax return preparation engine refines the estimated tax refund data based on the newly entered data of the user and based on a refined subset of historical users that share characteristics similar to the user.

In one embodiment, the tax return preparation engine generates the estimated tax refund data based on data values in the various data fields of the historical tax returns of those historical users who share characteristics with the current user. The tax return preparation engine can generate probabilistic estimates of data values of the various data fields of the user's tax return for which the user has not yet provided sufficient data for the calculation to be made based purely on the user's data and the tax rules data alone. The tax return preparation engine can calculate or refine the estimated tax refund based on the estimated data values in the various data fields.

In one embodiment, the tax return preparation system includes a user interface module that receives current user tax related data from the user as part of a tax return preparation interview. In one embodiment, the tax return preparation system includes a data acquisition module that gathers historical tax related data associated with historical users of the tax return preparation system. In one embodiment, the tax return preparation system also includes an inference engine that generates probabilistic inferences based on the current user tax related data and the historical tax related data and generates probabilistic inference data including one or more inferences about a financial the user. In one embodiment, the tax return preparation system generates personalized financial interview content based on the probabilistic inference data, including an estimated tax refund. The user interface module then provides an electronic personalized tax return preparation interview to the user and presents the estimated tax refund to the user. The interface module can also adjust other aspects of the tax return preparation interview based on the probabilistic inference data.

In one embodiment, the inference engine can analyze the current user tax related data and the historical tax related data according to one or more algorithms or analysis techniques. For example, in one embodiment, the inference engine can generate probabilistic inference data based on z-scores computed from the historical tax related data. The inference engine can utilize a logistic function to generate the probabilistic inference data. In one embodiment the inference engine may generate probabilistic inference data based on distribution of tax refunds associated with historical tax related data. The inference engine may generate probabilistic inference data based on Monte Carlo integration.

In one embodiment, the data acquisition module gathers historical tax related data or other financial or personal data from one or more government databases, third-party databases, social media databases, or other databases. The inference engine generates the probabilistic inference data based on the current user tax related data and the other financial or personal data.

The disclosed embodiments provide one or more technical solutions to the technical problem of deficiencies in tax return preparation systems by utilizing statistical probabilistic inferences to provide estimated tax refund data to the user. These and other embodiments of the tax return preparation system are discussed in further detail below.

Providing estimated tax refund data generated from a statistical analysis of historical tax related data and current user tax related data is a technical solution to a long standing technical problem and is not an abstract idea for at least a few reasons. First, providing estimated tax refund data generated from a statistical analysis of historical tax related data and current user tax related data is not an abstract idea because it is not merely an idea itself (e.g., can be performed mentally or using pen and paper). Second, providing estimated tax refund data generated from a statistical analysis of historical tax related data and current user tax related data is not an abstract idea because it is not a fundamental economic practice (e.g., is not merely creating a contractual relationship, hedging, mitigating a settlement risk, etc.). Third, providing estimated tax refund data generated from a statistical analysis of historical tax related data and current user tax related data is not an abstract idea because it is not a method of organizing human activity (e.g., managing a game of bingo). Fourth, although mathematics may be used to generate an analytics model, the disclosed and claimed methods and systems of providing estimated tax refund data generated from a statistical analysis of historical tax related data and current user tax related data are not an abstract idea because the methods and systems are not simply a mathematical relationship/formula.

Providing estimated tax refund data generated from a statistical analysis of historical tax related data and current user tax related data is not an abstract idea because providing more reliable tax refund data allows for significant improvement to the technical fields of user experience, customer service, customer retention, and electronic financial management, according to one embodiment. The present disclosure adds significantly to the field of electronic tax return preparation because the disclosed tax return preparation system: increases the likelihood that a user will not be shown an estimated tax refund that varies wildly throughout the tax return preparation interview; increases the likelihood that inadvertent data entry errors made by the user will be immediately noticed and brought to the attention of the user, increases the likelihood of improving/maintaining a user's trust in the tax return preparation system; and reduces the amount of time users spend in a tax return preparation interview, according to one embodiment.

As a result, embodiments of the present disclosure allow for reduced use of processor cycles, memory, and power consumption, by reducing the time spent by users sifting through various tax topics, entering data, and searching for answers among help topics due to an unnecessarily confusing tax return preparation interview process. Consequently, computing and communication systems implementing or providing the embodiments of the present disclosure are transformed into more operationally efficient devices and systems.

In addition to improving overall computing performance, providing estimated tax refund data generated from a statistical analysis of historical tax related data and current user tax related data significantly improves the field of tax return preparation systems, by reducing the amount of time it takes to progress a user through a tax return preparation interview, according to one embodiment. Therefore, both human and non-human resources are utilized more efficiently. Furthermore, by providing estimated tax refund data generated from a statistical analysis of historical tax related data and current user tax related data, loyalty in the tax return preparation system with which the tax return preparation system is associated, which results in repeat customers, efficient tax return preparation interviews such as tax return preparation interviews, and reduced abandonment of use of the tax return preparation system, according to one embodiment.

Figure 1:
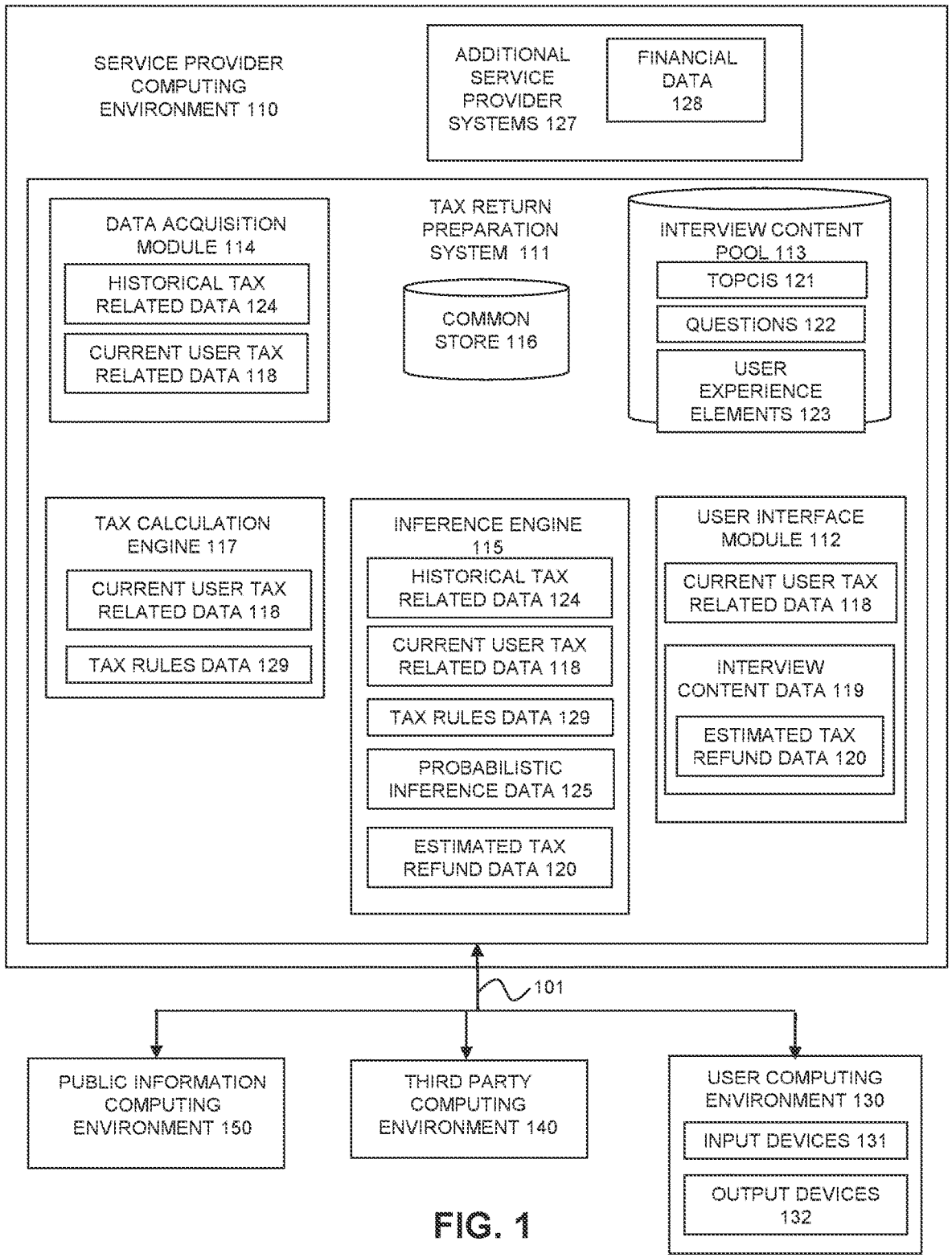
FIG. 1 is a block diagram of software architecture for providing estimated tax refund data generated from a statistical analysis of historical tax related data and current user tax related data, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed tax return preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

Hardware Architecture

FIG. 1 illustrates a block diagram of a production environment 100 for providing estimated tax refund data to a user of a tax return preparation system, according to one embodiment. Embodiments of the present disclosure provide methods and systems for providing estimated tax refund data generated from a statistical analysis of historical tax related data and current user tax related data, according to one embodiment. Embodiments of the present disclosure receive current user tax related data associated with the user in connection with a tax return preparation interview. Embodiments of the present disclosure gather, generate, or retrieve tax rules data related to rules and procedures for providing tax return preparation services to the user. Embodiments of the present disclosure also gather historical tax related data associated with previous users of the tax return preparation system. Embodiments of the present disclosure utilize the current user tax related data and the historical tax related data to generate statistical inferences about data that has not yet been provided by the user during the tax return preparation interview. Embodiments of the present disclosure combine these statistical inferences about the user with the tax rules data to generate estimated tax refund data corresponding to an estimated tax refund of the user. In particular, embodiments of the present disclosure generate the estimated tax refund data by identifying, from the historical tax related data, one or more subsets of historical users that share characteristics with the user based on the current user tax related data. Embodiments of the present disclosure utilize statistical analysis of the tax rules data and the historical tax related data associated with the one or more subsets of historical users in order to generate probabilistic inference data including inferences related to current user tax related data that the user has not yet provided to the tax return preparation system. Embodiments of the present disclosure use these statistical inferences to generate estimated tax refund that is likely to be relatively accurate even at early stages of the tax return preparation interview when the user has not yet provided much of the expected current user tax related data. Embodiments of the present disclosure can initially provide the estimated tax refund data as a likely range into which the user's tax refund will fall. As the tax return preparation interview continues and the user provides additional current user tax related data, the tax return preparation system continues to refine the estimated tax refund data by generating statistical inferences that are based on the additional current user tax related data and on a refined subset of historical users that share characteristics with the current user. Eventually, when the user has provided all of the expected current user tax related data, the tax return preparation system can provide a final tax refund estimate.

Embodiments of the present disclosure can also utilize probabilistic inferences to personalize the tax return preparation interview for the user in other ways. In particular, embodiments of the present disclosure can utilize the probabilistic inference data to transform, rearrange, create, or adjust various portions of the tax return preparation interview to be tailored to the likely characteristics of the user. The personalized tax return preparation interview can include a particular arrangement of tax related topics, selected financial questions, preselected answers to tax related questions, and omission of topics that are likely irrelevant. In this way, embodiments of the present disclosure dynamically personalize a tax return preparation interview to the user based on probabilistic inference data.

In addition, the disclosed method and system for providing estimated tax refund data generated from a statistical analysis of historical tax related data and current user tax related data provides for significant improvements to the technical fields of electronic financial management, electronic transaction data processing, data processing, data management, and user experience.

In addition, as discussed above, the disclosed method and system for providing estimated tax refund data generated from a statistical analysis of historical tax related data and current user tax related data provides for the processing and storing of smaller amounts of data, i.e., more efficiently collect financial data from the user and providing a tax return preparation interview to the user; thereby eliminating unnecessary data analysis and storage. Consequently, using the disclosed method and system for providing estimated tax refund data generated from a statistical analysis of historical tax related data and current user tax related data results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing estimated tax refund data generated from a statistical analysis of historical tax related data and current user tax related data.

The production environment 100 includes a service provider computing environment 110, a user computing environment 130, a third-party computing environment 140, and a public information computing environment 150 for providing estimated tax refund data generated from a statistical analysis of historical tax related data and current user tax related data, according to one embodiment. The computing environments 110, 130, 140, and 150 are communicatively coupled to each other with one or more communication channels 101, according to one embodiment.

The service provider computing environment 110 represents one or more computing systems such as a server or a distribution center that is configured to receive, execute, and host one or more tax return preparation systems (e.g., applications) for access by one or more users, for providing a personalized tax return preparation interview to a user, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a tax return preparation system 111, which is configured to provide estimated tax refund data content to a user.

The tax return preparation system 111 receives current user tax related data from a user, retrieves tax rules data, gathers historical tax related data related to previous users of the tax return preparation system 111, generates probabilistic inference data based on the historical tax related data and the tax rules data, and provides estimated tax refund data to the user based on the probabilistic inference data, according to one embodiment. The tax return preparation system 111 includes various components, databases, engines, modules, and/or data to support providing dynamic estimated tax refund data to a user, according to one embodiment.

The tax return preparation system 111 includes a user interface module 112, an interview content pool 113, a data acquisition module 114, an inference engine 115, a common store 116, and a tax calculation engine 117, according to one embodiment.

According to an embodiment, the user interface module 112 presents a tax return preparation interview to the user by providing interview content data 119 to the user. The interview content data 119 guides a user through a series of tax topics, asks questions, and invites the user to provide data related to tax topics and questions. The user interface module 112 receives current user tax related data 118 in response to providing interview content data 119, according to one embodiment. The interview content data 119 includes estimated tax refund data 120 based, at least in part, on the current user tax related data 118.

According to an embodiment, the user interface module 112 is configured to receive the current user tax related data 118 from the user or from other sources. The current user tax related data 118 includes information, such as, but not limited to, a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupational information, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a tax return preparation system or in the preparation of financial documents such as a user's tax return, according to various embodiments.

According to an embodiment, the user interface module 112 populates interview content 119 from a content pool 113. The content pool 113 includes topics 121, questions 122, and user experience elements 123. Each topic 121 can be presented to the user with one or more questions 122 and user experience elements 123, according to one embodiment. The user experience elements include, but are not limited to, buttons, slides, dialog boxes, text boxes, drop-down menus, banners, tabs, directory trees, links, audio content, video content, and/or other multimedia content for presenting topics and questions to the user and for receiving current user tax related data 118 from the user computing environment 130.

The user computing environment 130 includes input devices 131 and output devices 132 for communicating with the user, according to one embodiment. The input devices 131 include, but are not limited to, keyboards, mice, microphones, touchpads, touchscreens, digital pens, and the like. The output devices 132 include, but are not limited to, speakers, monitors, touchscreens, and the like.

Returning to the tax return preparation system 111, the data acquisition module 114 is configured to acquire additional information from various sources to merge with or supplement the current user tax related data 118, according to one embodiment. For example, while the user interface module 112 may receive current user tax related data 118 from the user in response to questions or prompts, the data acquisition module 114 is configured to gather additional current user tax related data 118 from sources other than the user. For example, the data acquisition module 114 can retrieve previously collected current user tax related data 118 from one or more databases of the tax return preparation system 111, such as the common store 116. The data acquisition module 114 can also gather current user tax related data 118 from third-party computing environment 140 or from the public information computing environment 150. The data acquisition module 114 can also gather current user tax related data 118 from additional service provider systems 127 associated with the tax return preparation system 111.

In one embodiment, the data acquisition module 114 is configured to gather historical tax related data 124 related to historical users of the tax return preparation system 111. The historical tax related data 124 can include the same types of data as the current user tax related data 118, except that the historical tax related data 124 is associated with historical users of the tax return preparation system 111. According to an embodiment, the historical tax related data 124 can include, for each of a plurality of historical users of the tax return preparation system 111, some or all of the types of data that might typically be collected from the user as part of a tax return preparation interview. The historical tax related data 124 can include additional types of data that would not normally be collected from the user in a tax return preparation interview.

In one embodiment, the data acquisition module 114 is configured to communicate with additional service provider systems 127 to access financial data 128. The data acquisition module 114 imports relevant portions of the financial data 128 into the tax return preparation system 111 and, for example, saves local copies into one or more databases, according to one embodiment.

In one embodiment, the additional service provider systems 127 include a payroll system that manages the payroll of a large number of employers. The data acquisition module 114 is configured to acquire information from the financial data 128, for use by the tax return preparation system 111 in providing estimated tax refund data to the user, according to one embodiment. Since the financial services provider provides both the tax return preparation system 111 and the payroll system, the service provider computing environment 110 can be configured to share financial data 128 between the various systems. By interfacing with the additional service provider systems 127, the data acquisition module 114 acquires historical tax related data 124. The information can include income data, salary data, geographic location data, numbers of exemptions claimed, length of tenure with the employer, banking data, withholding data, investment data, and other types of data that indicate financial and personal characteristics of the employees of the employer.

The additional service provider systems 127 can include financial services other than payroll and tax return preparation systems. For example, the additional service provider systems can include personal tax return preparation systems that manage one or more of banking, investments, credit cards, loans, retirement accounts, budgeting, or financial interests. The data acquisition module 114 can gather financial data from databases associated with the additional service provider systems 127.

The data acquisition module 114 is configured to acquire data from third parties, according to one embodiment. For example, the data acquisition module 114 requests and receives data from the third-party computing environment 140 to supply or supplement the historical tax related data 124, according to one embodiment. In one embodiment, the third-party computing environment 140 is configured to automatically transmit financial data to the tax return preparation system 111 (e.g., to the data acquisition module 114), to be merged into historical tax related data 124. The third-party computing environment 140 can include, but is not limited to, financial service providers, state institutions, federal institutions, private employers, financial institutions, and any other business, organization, or association that has maintained financial data, that currently maintains financial data, or which may in the future maintain financial data, according to one embodiment. The data acquisition module 114 can also acquire data from sources such as social media sources, such as Twitter, Facebook, LinkedIn, and the like.

In one embodiment, the data acquisition module 114 is configured to acquire additional financial data from the public information computing environment 150, according to one embodiment. The historical tax related data 124 can be gathered from public record searches of tax records, public information databases, property ownership records, and other public sources of information.

In one embodiment, the tax calculation engine 117 calculates or otherwise generates data values for the various data fields of the user's tax return based on the current user tax related data 118 and tax rules data 129. As the user provides current user tax related data 118, the tax calculation engine calculates data values for the tax return of the user based on the user tax related data 118 and the tax rules data 129. Some data values for the various data fields of the tax returns, or the various data fields of the other tax documents and worksheets associated with the tax return, are numerical values calculated by the tax calculation engine 117. Other data values for the various data fields include text strings or numerical values provided directly by the user. The tax calculation engine 117 populates the data fields of the tax return, or other forms or worksheets associated with the tax return, based on the current user tax related data 118 and the tax rules data 129.

In one embodiment, the tax rules data 129 includes externally generated tax rules data related to tax laws, tax regulations, electronic versions of tax forms, electronic versions of financial worksheets, etc. The tax return preparation system 111 can gather or receive the tax rules data 129 from sources external to the tax return preparation system 111. The externally generated tax rules data can be received from government sources, from third party sources, or from other sources.

In one embodiment, the tax rules data 129 also includes internal tax rules data. The internal tax rules data includes internally generated data used by the tax return preparation system 111 in order to fill out the various tax forms and worksheets associated with preparation of a tax return and to otherwise comply with tax regulations and rules. The internal tax rules data can include procedures for generating data values for the various lines of financial forms based on current user tax related data 118. For example, the internal tax rules data can include data that indicates, for each line of the various financial forms and worksheets, what data points or dependencies go into calculating a data value for the line. These data points or dependencies can include lines from the same tax form or worksheet, lines from other tax forms or worksheets, constants, or other data points that may be utilized in generating or calculating a data value for a given line of the tax form or worksheet. The internal tax rules data can include specific mathematical operations, calculations, or relations for generating correct data values for various lines of the financial form or worksheet.

Traditional tax return preparation systems typically generate data values for the tax return based purely on the data that has been provided so far by the user in accordance with the tax rules data utilized by the traditional tax return preparation system. In one example, a traditional tax return preparation system may utilize a particular function in order to calculate the data value for a particular data field of a tax related form. The function may require three input values in order to generate the proper data value. If the user has only supplied data sufficient to provide two of the three input values, then the traditional tax return preparation will simply provide no data value, or worse, an incomplete data value. In the case of a tax refund value, the tax refund value may be based on hundreds of data values provided by the user.

During the tax return preparation process, the traditional tax return preparation system may provide an estimated tax refund that is based only on the incomplete data provided by the user up to that point. As the user provides additional data, the estimated tax refund provided by the traditional tax return preparation system can undergo wild swings. For example, after the user of a traditional tax return preparation system enters a gross income, and before the user has entered any data related to taxes withheld or deductions, the traditional tax return preparation system may display an estimated large tax liability to the user because mitigating data has not yet been entered. This can dismay the user and can cause him to abandon the traditional tax return preparation system, even though if the user had continued to input data to the traditional tax return preparation system, the traditional tax return preparation system may have eventually indicated that the user is due a large tax refund.

In one embodiment, the tax return preparation system 111, in accordance with principles of the present disclosure, utilizes the inference engine 115 to supplement the calculations made by the tax calculation engine 117 at stages of the tax return preparation process in which the user has not yet provided all of the current user tax related data 118 that will be required for a complete tax return. In particular, the tax return preparation system 111 uses the inference engine 115 to analyze the current user tax related data 118, the tax rules data 129, and the historical tax related data 124 in order to generate probabilistic inference data 125 that includes probabilistic inferences related to data values not yet provided by the user, but that would be necessary for the tax calculation engine 117 to calculate final data values for the tax return. In particular, the inference engine 115 can compare the current user tax related data 118 to the historical tax related data 124 in order to identify one or more subsets of historical users of the tax return preparation system 111 that have characteristics similar to those included in the current user tax related data 118. The inference engine 115 analyzes the historical tax related data 124 related to the one or more subsets of historical users that share similarities with the user. The inference engine 115 generates probabilistic inference data 125 based on the current user tax related data 118, the historical tax related data 124, and the tax rules data 129. The inference engine 115 can determine what data types or data values from the historical tax related data 124 should be analyzed based at least in part on the tax rules data 129. The probabilistic inference data 125 includes inferences related to current user tax related data related to the user that has not yet been obtained by the tax return preparation system 111. The inference engine 115 uses statistical analysis for each of a selected number of data types or values that have not yet been collected from the user in order to infer what the data is likely to be, based on the one or more subsets of historical users. The inference engine 115 can generate the estimated tax refund data 120 based on the probabilistic inference data 125.

In one embodiment, the inference engine 115 can generate the estimated tax refund data 120 even early stages of a tax return preparation interview in which the user has only provided a little of the current user tax related data 118 that will be necessary to fully complete the tax return preparation process. The inference engine 115 generates estimated tax refund data 120 based on the limited current user tax related data 118, the tax rules data 129, and the historical tax related data 124. Because the estimated tax refund data 120 is generated based on probabilistic inferences, the estimated tax refund data 120 is likely to be relatively accurate even at the early stages of the tax return preparation interview.

In one embodiment, the inference engine 115 generates estimated tax refund data 120 in the form of a probable tax refund range or distribution. For example, the inference engine 115 can provide an estimated tax refund range that includes the range of tax refunds that fall within a standard deviation of the median tax refund of historical users that share characteristics with the current user based on the current user tax related data 118 supplied by the current user so far. The inference engine 115 can provide an estimated tax refund range based on other statistical or probabilistic considerations.

In one embodiment, the tax return preparation system 111 provides the estimated tax refund data 120 via the user interface module 112 at an early stage of the tax return preparation interview. As the tax return preparation interview continues, the user continues to provide additional current user tax related data 118. As the user continues to provide current user tax related data 118, the inference engine 115 continues to refine the estimated tax refund data 120 based on the additional current user tax related data 118 and on a refined subset of the historical tax related data 124, as well as in conjunction with the tax rules data 129. The user interface module 112 provides the refined estimated tax refund data 120 throughout the interview process. Though the estimated tax refund data 120 gradually becomes more accurate throughout the tax return preparation process, the estimated tax refund data 120 does not undergo wild swings or changes that can surprise, confuse, and discourage the user. Instead, the user is encouraged by the stability and accuracy of the estimated tax refund data 120.

According to one embodiment, as an illustrative example, during the early stages of the tax return preparation interview the user provides current user tax related data 118 indicating that the user has a gross income of $100,000, is 35 years old, lives in a particular area of Phoenix Ariz., and is employed as a software engineer by a particular employer. The inference engine 115 analyzes the historical tax related data 124 and identifies a subset of historical users that share similar characteristics as those provided by the user. A statistical analysis of the historical tax related data 124 associated with the subset of historical users indicates that 98% of historical users in the subset received tax refunds between $2500 and $3500. The inference engine 115 generates estimated tax refund data 120 including the display of an estimated refund of between $2500 and $3500. The tax return preparation system presents this estimated refund range to the user even though the user has not yet entered tax withholding data or deduction data. Because the estimated tax refund is generated from the probabilistic inference data 125 that includes an analysis of a large number of historical tax returns, as the user continues to provide current user tax related data 118 throughout the tax return preparation interview, the estimated tax refund is unlikely to vary from the estimated range. As the user continues to enter current user tax related data 118 throughout the tax return preparation process, the inference engine 115 can update the estimated tax refund. At the end of the tax return preparation process the user is pleased to see that the final tax refund value is $3300, within the estimated range displayed near the beginning of the tax return preparation interview.

In one embodiment, the tax return preparation system 111 can utilize the probabilistic inference data 125 to personalize and enhance the tax return preparation interview in ways other than in providing an estimated tax refund. If the inference engine 115 finds that some inferences can be made with a high probability of being correct, for example beyond a threshold probability, then the inference engine 115 generates probabilistic inference data 125 that includes these inferences that have a high probability of being correct. The inference engine 115 can then generate personalized tax return preparation data based on the probabilistic inference data 125. The personalized tax return preparation data can include topics that are very likely to be relevant to the user. The personalized tax return preparation data can omit topics that are very likely to be irrelevant to the user. The personalized tax return preparation data can include questions with preselected answers. The estimated tax refund data 120 can include prompts for the user to review or confirm the preselected answers. The personalized tax return preparation data can include estimations of amounts of money owed to or owed by user. All these items can serve to speed up the tax return preparation interview and to improve the user's experience.

In one embodiment, at the beginning of the tax return preparation interview, or even before the tax return preparation interview begins, the user provides current user tax related data. For example, at the beginning of the tax return preparation interview, the user may be prompted to provide basic tax related data such as the age of the user, the address of the user, the gender of the user, a marital status of the user, information relating to children or other dependents of the user, or many other kinds of basic information. Additionally, the user may be prompted to provide data related to a W-2 form such as gross income, tax withholdings, an employer identification number, etc. At this early stage of the tax return preparation interview, the user has only entered a fraction of the total data that may typically be required to complete the full tax return preparation process. Advantageously, the tax return preparation system in accordance with embodiments of the present disclosure, can already begin to personalize the tax return preparation process in a way that enhances and speeds up the tax return preparation interview process for the user. In particular, the inference engine 115 analyzes the current user tax related data 118 and the historical tax related data 124 in order to identify from the historical tax related data one or more subsets of historical users that share characteristics of the user. For example, the inference engine 115 may identify users that reside in a same area as the user, that are a similar age as the user, that share the same employer or a similar employer as the user, the have the same job title as the user, that have a similar income as the user, that have similar tax withholding as the user, that had a similar family situation, etc. The inference engine 115 can then analyze the historical tax related data related to these subsets of users in order to make inferences about the user with regards to data that has not yet been collected from the user. The inference engine 115 can identify data points for which a statistical analysis indicates that there is a high probability of the user having a particular data value. The inference engine 115 can then generate estimated tax refund data 120 or personalized tax return preparation data that takes into account the probabilistic inference data 125.

In one example, a user is preparing a tax return. In beginning of the tax return preparation interview, the user provides data indicating the user's age, the user's address, the user's occupation, and the user's income. The inference engine 115 analyzes the historical tax related data 124 and finds one or more subsets of historical users that share one or more of these characteristics of the user. The inference engine 115 further analyzes the historical tax related data related to those subsets of historical users in order to make inferences about the user. A statistical analysis of the historical tax related data 124 related to those subsets of historical users indicates that historical users that live in the same or similar areas as the user, that have an income in a similar range as the user, and that have a same marital status as the user are highly likely to be homeowners. The inference engine 115 generates probabilistic inference data 125 indicating that the user is highly likely to be a homeowner. The inference engine 115 generates personalized tax return preparation data based on the probabilistic inference that the user is a homeowner. The personalized tax return preparation data includes providing a question to the user as to whether or not the user is a homeowner and pre-filling an option for "yes". Additionally, the personalized tax return preparation data can include presenting to the user a topic related to mortgage interest deductions based on the inference that the user is a homeowner. The personalized tax return preparation data can also omit topics related to deductions for those that rented a home. In this way, the tax return preparation system 111 streamlines a tax return preparation interview for the user by inferring answers to some questions on behalf of the user and by presenting some topics and omitting other topics based on this inference. This speeds up the tax return preparation interview process and delivers a more pleasing experience to the user. The tax return preparation system can utilize the tax rules data in order to determine what types of data from the historical tax related data 124 should be analyzed in order to generate probabilistic inference data 125.

In one embodiment, the tax return preparation system uses the tax rules data, the current user tax related data that has been provided by or obtained from the user, and the historical tax related data related to previous users of the tax return preparation system in order to make probabilistic inferences regarding data that has not yet been provided by the user. For example, a government tax form may include text related to line 5 that says "This value is the lesser of $6000 and the sum of line 3 and line 4." The tax rules data includes a specific function for generating the correct value for line 5. However, during a tax return preparation interview, the user may not yet have provided the data related to line 4. The tax return preparation system can make a probabilistic inference in order to generate a likely value for line 5 for the user even though the user has not yet provided the value for line 4. In particular, the tax return preparation system analyzes the tax rules data and identifies the various dependencies for generating the correct value for line 5 and identifies that the value for line 4 is needed. The tax return preparation system accesses historical user related data, identifies historical users that are similar to the current user, retrieves the values for line 4 related to the historical users, and makes a probabilistic inference as to the likely value of line 5 for the user based on the values for line 4 related to the historical users. In this way, the tax return preparation system can utilize tax rules data, historical tax related data, and current user tax related data in order to make probabilistic inferences about the user.

According to an embodiment, the probabilistic inference data 125 can include an inference that the user has made an error in providing the current user tax related data 118. For example, as the user begins to provide user related financial data at the beginning of the tax return preparation interview, the inference engine 115 can analyze the historical tax related data 124 in order to identify one or more subsets of historical users with similar characteristics as those provided by the user. As the user continues to enter current user tax related data 118, the inference engine 115 can continue to analyze the additional data entries and can compare them to the statistical distribution of corresponding data entries in the historical tax related data 124 associated with the one or more subsets of the historical users. The inference engine 115 may determine that a data entry made by the user is highly improbable based on the statistical distribution associated with the one or more subsets of historical users. The inference engine 115 may then generate probabilistic inference data 125 that includes an inference that the user has made an error in a particular data entry. The inference engine 115 also generates personalized tax return preparation data that can be provided to the user indicating to the user that the user has possibly made an error. The personalized tax return preparation data provided to the user can highlight the possible error and can prompt the user to review the possibly erroneous data input and make a correction if an error has indeed been made.

As a specific illustrative example in which the tax return preparation system 111 is a tax return preparation system, a user begins a tax return preparation interview and enters data indicating that the user is 25 years old, lives in Denver Colo., has no dependents, and is a high school teacher. The inference engine 115 analyzes the historical tax related data 124 to identify one or more subsets of historical users with characteristics similar to those of the user. As the user continues to enter data, the user makes a data entry indicating that the user has a gross income of $510,000. The inference engine 115 analyzes the historical tax related data 124 related to the subset of historical users similar to the user. The inference engine 115 performs a statistical analysis of the income reported by the subset of historical users and determines that 99% of them had an income between $40,000 and $60,000. The inference engine 115 generates probabilistic inference data 125 including an inference that the user has made an error in entering his gross income because it is highly improbable that the user has an income of $510,000 when there are no historical users in the subset that have an income in a similar range. The probabilistic inference data 125 infers that the user has made an error, possibly by typing an extra zero. The inference engine 115 generates personalized tax return preparation data that includes a personalized prompt to the user to review the gross income number as entered by the user. The user reviews the gross income amount as prompted by the personalized tax return preparation data and sees that he has indeed entered an extra zero by mistake. The user corrects this error and enters a gross income of $51,000. The inference engine 115 compares this new income value to the subset of similar users and determines that the new income value is not likely to be an error. The user is grateful that the tax return preparation system found this error in real time so that the error could be corrected with little inconvenience to the user.

In one embodiment, the inference engine 115 can identify the one or more subsets of similar historical users by matching the user to one or more profiles, according to one embodiment. The inference engine 115 identifies one or more profiles with which the user shares financial or personal characteristics and can match the user to one or more of the profiles that share a comparatively large number of characteristics or certain heavily weighted characteristics. Process FIG. 2 illustrates a functional flow diagram of a process 200 for providing estimated tax refund data to a user of a tax return preparation system, in accordance with one embodiment.

Figure 2:
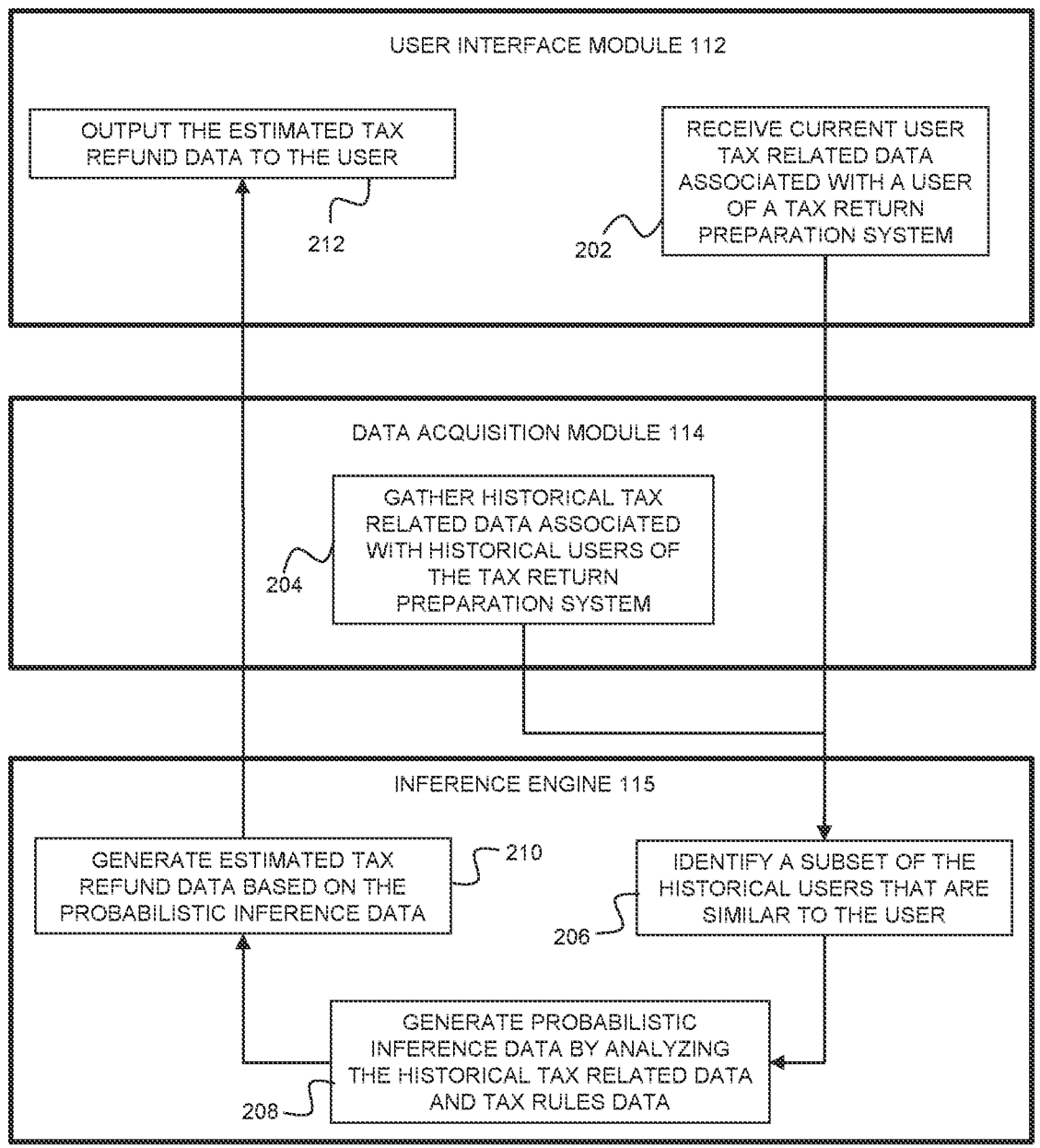
FIG. 2 is a block diagram of a process for providing estimated tax refund data generated from a statistical analysis of historical tax related data and current user tax related data, in accordance with one embodiment.

Referring to FIGS. 1 and 2 together, at block 202, the user interface module 112 receives current user tax related data associated with a user of a tax return preparation system, according to one embodiment.

At block 204, the data acquisition module 114 gathers historical tax related data associated with historical users of the tax return preparation system. From block 204, the process proceeds to block 206.

At block 206, the inference engine 115 identifies a subset of the historical users that are similar to the user, according to one embodiment. From block 206, the process proceeds to block 208.

At block 208, the inference engine 115 generates probabilistic inference data by analyzing the historical tax related data and tax rules data, according to one embodiment. From block 208, the process proceeds to block 210.

At block 210, the inference engine 115 generates estimated tax refund data based on the probabilistic inference data, according to one embodiment. From block 210, the process proceeds to block 212.

At block 212, the user interface module 112 outputs the estimated tax refund data to the user in a tax return preparation interview, according to one embodiment.

Although a particular sequence is described herein for the execution of the process 200, other sequences can also be implemented.

Figure 3:
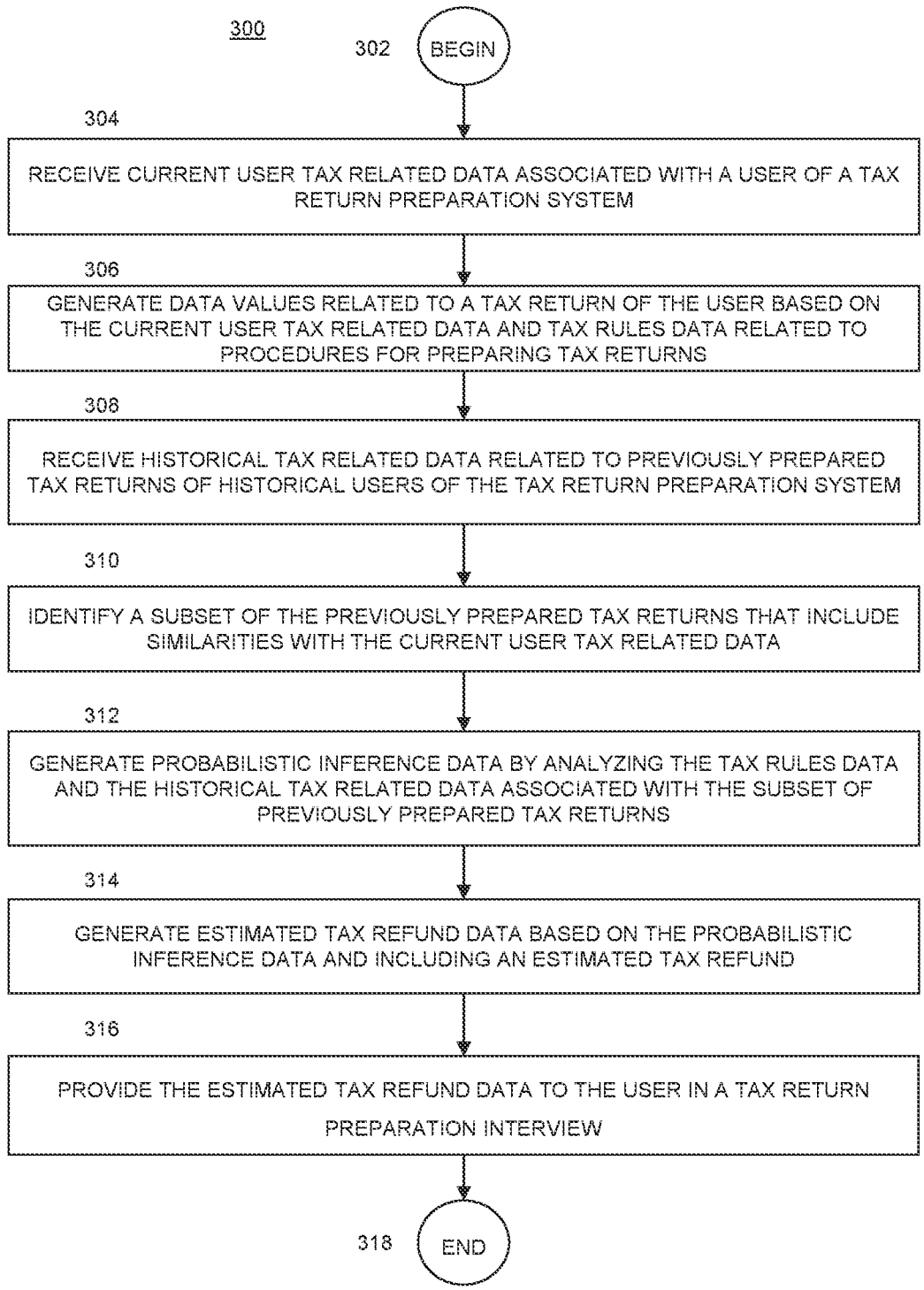
FIG. 3 is a flow diagram of a process for providing estimated tax refund data generated from a statistical analysis of historical tax related data and current user tax related data, in accordance with one embodiment.

FIG. 3 illustrates a flow diagram of a process 300 for providing estimated tax refund data to a user of a tax return preparation system, according to various embodiments.

In one embodiment, process 300 for providing estimated tax refund data to a user of a tax return preparation system begins at BEGIN 302 and process flow proceeds to RECEIVE CURRENT USER TAX RELATED DATA ASSOCIATED WITH A USER OF A TAX RETURN PREPARATION SYSTEM 304.

In one embodiment, at RECEIVE CURRENT USER TAX RELATED DATA ASSOCIATED WITH A USER OF A TAX RETURN PREPARATION SYSTEM 304 process 300 for providing estimated tax refund data to a user of a tax return preparation system receives current user tax related data associated with a user of a tax return preparation system.

In one embodiment, once process 300 for providing estimated tax refund data to a user of a tax return preparation system receives current user tax related data associated with a user of a tax return preparation system at RECEIVE CURRENT USER TAX RELATED DATA ASSOCIATED WITH A USER OF A TAX RETURN PREPARATION SYSTEM 304 process flow proceeds to GENERATE DATA VALUES RELATED TO A TAX RETURN OF THE USER BASED ON THE CURRENT USER TAX RELATED DATA AND TAX RULES DATA RELATED TO PROCEDURES FOR PREPARING TAX RETURNS 306.

In one embodiment, at GENERATE DATA VALUES RELATED TO A TAX RETURN OF THE USER BASED ON THE CURRENT USER TAX RELATED DATA AND TAX RULES DATA RELATED TO PROCEDURES FOR PREPARING TAX RETURNS 306, process 300 for providing estimated tax refund data to a user of a tax return preparation system generates data values related to a tax return of the user based on the current user tax related data and tax rules data related to procedures for preparing tax returns.

In one embodiment, once process 300 for providing estimated tax refund data to a user of a tax return preparation system generates data values related to a tax return of the user based on the current user tax related data and tax rules data related to procedures for preparing tax returns at GENERATE DATA VALUES RELATED TO A TAX RETURN OF THE USER BASED ON THE CURRENT USER TAX RELATED DATA AND TAX RULES DATA RELATED TO PROCEDURES FOR PREPARING TAX RETURNS 306, process flow proceeds to RECEIVE HISTORICAL TAX RELATED DATA RELATED TO PREVIOUSLY PREPARED TAX RETURNS OF HISTORICAL USERS OF THE TAX RETURN PREPARATION SYSTEM 308.

In one embodiment, at RECEIVE HISTORICAL TAX RELATED DATA RELATED TO PREVIOUSLY PREPARED TAX RETURNS OF HISTORICAL USERS OF THE TAX RETURN PREPARATION SYSTEM 308, process 300 for providing estimated tax refund data to a user of a tax return preparation system receives historical tax related data related to previously prepared tax returns of historical users of the tax return preparation system.

In one embodiment, once process 300 for providing estimated tax refund data to a user of a tax return preparation system receives historical tax related data related to previously prepared tax returns of historical users of the tax return preparation system at RECEIVE HISTORICAL TAX RELATED DATA RELATED TO PREVIOUSLY PREPARED TAX RETURNS OF HISTORICAL USERS OF THE TAX RETURN PREPARATION SYSTEM 308, process flow proceeds to IDENTIFY A SUBSET OF THE PREVIOUSLY PREPARED TAX RETURNS THAT INCLUDE SIMILARITIES WITH THE CURRENT USER TAX RELATED DATA 310.

In one embodiment, at IDENTIFY A SUBSET OF THE PREVIOUSLY PREPARED TAX RETURNS THAT INCLUDE SIMILARITIES WITH THE CURRENT USER TAX RELATED DATA 310 the process 300 for providing estimated tax refund data to a user of a tax return preparation system identifies a subset of the previously prepared tax returns that include similarities with the current user tax related data.

In one embodiment, once process 300 for providing estimated tax refund data to a user of a tax return preparation system identifies a subset of the previously prepared tax returns that include similarities with the current user tax related data at IDENTIFY A SUBSET OF THE PREVIOUSLY PREPARED TAX RETURNS THAT INCLUDE SIMILARITIES WITH THE CURRENT USER TAX RELATED DATA 310 process flow proceeds to GENERATE PROBABILISTIC INFERENCE DATA BY ANALYZING THE TAX RULES DATA AND THE HISTORICAL TAX RELATED DATA ASSOCIATED WITH THE SUBSET OF PREVIOUSLY PREPARED TAX RETURNS 312.

In one embodiment, at GENERATE PROBABILISTIC INFERENCE DATA BY ANALYZING THE TAX RULES DATA AND THE HISTORICAL TAX RELATED DATA ASSOCIATED WITH THE SUBSET OF PREVIOUSLY PREPARED TAX RETURNS 312 the process 300 for providing estimated tax refund data to a user of a tax return preparation system generates probabilistic inference data by analyzing the tax rules data and the historical tax related data associated with the subset of previously prepared tax returns.

In one embodiment, once process 300 for providing estimated tax refund data to a user of a tax return preparation system generates probabilistic inference data by analyzing the tax rules data and the historical tax related data associated with the subset of previously prepared tax returns at GENERATE PROBABILISTIC INFERENCE DATA BY ANALYZING THE TAX RULES DATA AND THE HISTORICAL TAX RELATED DATA ASSOCIATED WITH THE SUBSET OF PREVIOUSLY PREPARED TAX RETURNS 312, process flow proceeds to GENERATE ESTIMATED TAX REFUND DATA BASED ON THE PROBABILISTIC INFERENCE DATA AND INCLUDING AN ESTIMATED TAX REFUND 314.

In one embodiment, at GENERATE ESTIMATED TAX REFUND DATA BASED ON THE PROBABILISTIC INFERENCE DATA AND INCLUDING AN ESTIMATED TAX REFUND 314 the process 300 for providing estimated tax refund data to a user of a tax return preparation system generates estimated tax refund data based on the probabilistic inference data and including an estimated tax refund.

In one embodiment, once the process 300 for providing estimated tax refund data to a user of a tax return preparation system generates estimated tax refund data based on the probabilistic inference data and including an estimated tax refund at GENERATE ESTIMATED TAX REFUND DATA BASED ON THE PROBABILISTIC INFERENCE DATA AND INCLUDING AN ESTIMATED TAX REFUND 314, process flow proceeds to PROVIDE THE ESTIMATED TAX REFUND DATA TO THE USER IN A TAX RETURN PREPARATION INTERVIEW 316.

In one embodiment, at PROVIDE THE ESTIMATED TAX REFUND DATA TO THE USER IN A TAX RETURN PREPARATION INTERVIEW 316 the process 300 for providing estimated tax refund data to a user of a tax return preparation system provides the estimated tax refund data to the user in a tax return preparation interview.

In one embodiment, once the process 300 for providing estimated tax refund data to a user of a tax return preparation system provides the estimated tax refund data to the user in a tax return preparation interview at PROVIDE THE ESTIMATED TAX REFUND DATA TO THE USER IN A TAX RETURN PREPARATION INTERVIEW 316, process flow proceeds to END 318.

In one embodiment, at END 318 the process for providing estimated tax refund data to a user of a tax return preparation system is exited to await new data and/or instructions.

Figure 4:
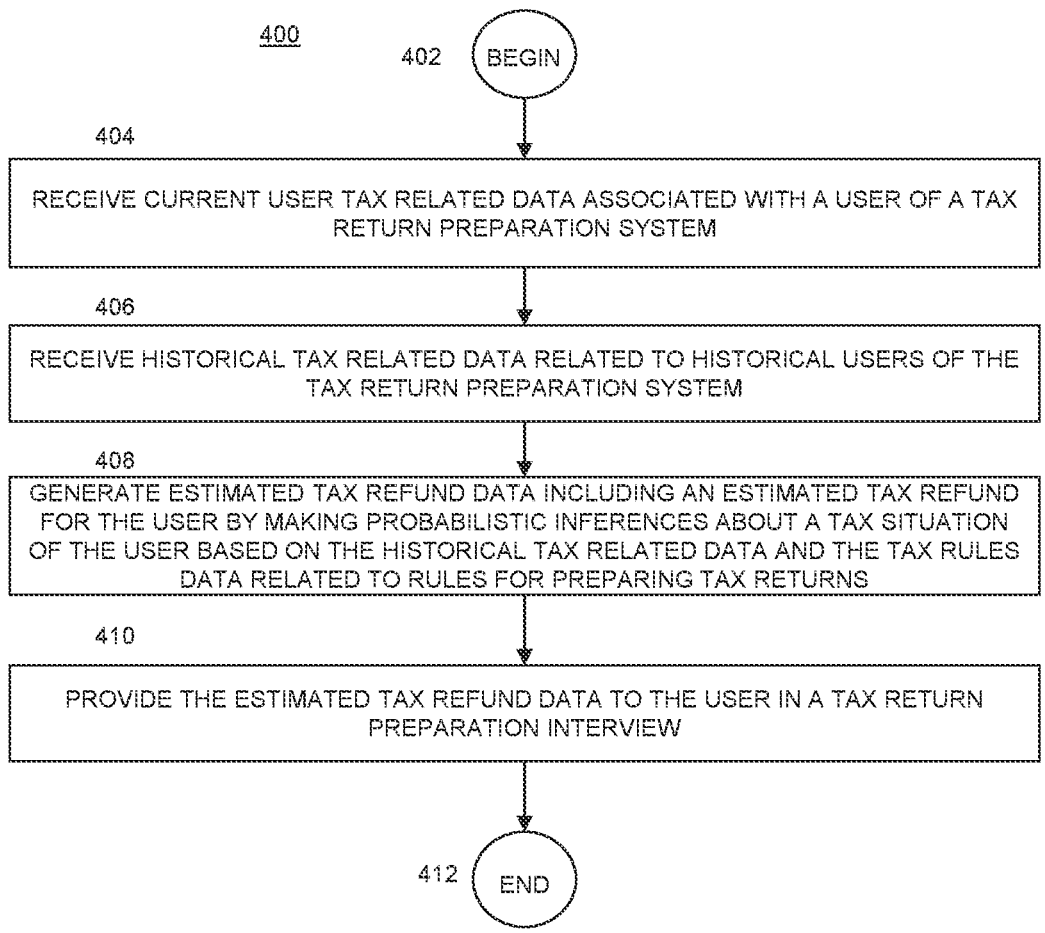
FIG. 4 is a flow diagram of a process for providing estimated tax refund data generated from a statistical analysis of historical tax related data and current user tax related data, in accordance with one embodiment.

FIG. 4 illustrates a flow diagram of a process 400 for providing estimated tax refund data to a user of a tax return preparation system, according to various embodiments.

In one embodiment, process 400 for providing estimated tax refund data to a user of a tax return preparation system begins at BEGIN 402 and process flow proceeds to RECEIVE CURRENT USER TAX RELATED DATA ASSOCIATED WITH A USER OF A TAX RETURN PREPARATION SYSTEM 404.

In one embodiment, at RECEIVE CURRENT USER TAX RELATED DATA ASSOCIATED WITH A USER OF A TAX RETURN PREPARATION SYSTEM 404 process 400 for providing estimated tax refund data to a user of a tax return preparation system receives current user tax related data associated with a user of a tax return preparation system.

In one embodiment, once process 400 for providing estimated tax refund data to a user of a tax return preparation system receives current user tax related data associated with a user of a tax return preparation system at RECEIVE CURRENT USER TAX RELATED DATA ASSOCIATED WITH A USER OF A TAX RETURN PREPARATION SYSTEM 404 process flow proceeds to RECEIVE HISTORICAL TAX RELATED DATA RELATED TO HISTORICAL USERS OF THE TAX RETURN PREPARATION SYSTEM 406.

In one embodiment, at RECEIVE HISTORICAL TAX RELATED DATA RELATED TO HISTORICAL USERS OF THE TAX RETURN PREPARATION SYSTEM 406, process 400 for providing estimated tax refund data to a user of a tax return preparation system receives historical tax related data related to historical users of the tax return preparation system.

In one embodiment, once process 400 for providing estimated tax refund data to a user of a tax return preparation system receives historical tax related data related to historical users of the tax return preparation system at RECEIVE HISTORICAL TAX RELATED DATA RELATED TO HISTORICAL USERS OF THE TAX RETURN PREPARATION SYSTEM 406, process flow proceeds to GENERATE ESTIMATED TAX REFUND DATA INCLUDING AN ESTIMATED TAX REFUND FOR THE USER BY MAKING PROBABILISTIC INFERENCES ABOUT A TAX SITUATION OF THE USER BASED ON THE HISTORICAL TAX RELATED DATA AND THE TAX RULES DATA RELATED TO RULES FOR PREPARING TAX RETURNS 408.

In one embodiment, at GENERATE ESTIMATED TAX REFUND DATA INCLUDING AN ESTIMATED TAX REFUND FOR THE USER BY MAKING PROBABILISTIC INFERENCES ABOUT A TAX SITUATION OF THE USER BASED ON THE HISTORICAL TAX RELATED DATA AND THE TAX RULES DATA RELATED TO RULES FOR PREPARING TAX RETURNS 408, process 400 for providing estimated tax refund data to a user of a tax return preparation system generates estimated tax refund data including an estimated tax refund for the user by making probabilistic inferences about a tax situation of the user based on the historical tax related data and the tax rules data related to rules for preparing tax returns.

In one embodiment, once process 400 for providing estimated tax refund data to a user of a tax return preparation system generates estimated tax refund data including an estimated tax refund for the user by making probabilistic inferences about a tax situation of the user based on the historical tax related data and the tax rules data related to rules for preparing tax returns at GENERATE ESTIMATED TAX REFUND DATA INCLUDING AN ESTIMATED TAX REFUND FOR THE USER BY MAKING PROBABILISTIC INFERENCES ABOUT A TAX SITUATION OF THE USER BASED ON THE HISTORICAL TAX RELATED DATA AND THE TAX RULES DATA RELATED TO RULES FOR PREPARING TAX RETURNS 408, process flow proceeds to PROVIDE THE ESTIMATED TAX REFUND DATA TO THE USER IN A TAX RETURN PREPARATION INTERVIEW 410.

In one embodiment, at PROVIDE THE ESTIMATED TAX REFUND DATA TO THE USER IN A TAX RETURN PREPARATION INTERVIEW 410 the process 400 for providing estimated tax refund data to a user of a tax return preparation system provides the estimated tax refund data to the user in a tax return preparation interview.

In one embodiment, once process 400 for providing estimated tax refund data to a user of a tax return preparation system provides the estimated tax refund data to the user in a tax return preparation interview at PROVIDE THE ESTIMATED TAX REFUND DATA TO THE USER IN A TAX RETURN PREPARATION INTERVIEW 410 process flow proceeds to END 412.

As noted above, the specific illustrative examples discussed above are but illustrative examples of implementations of embodiments of the method or process for providing a tax refund confidence indicator to a user. Those of skill in the art will readily recognize that other implementations and embodiments are possible. Therefore, the discussion above should not be construed as a limitation on the claims provided below.

In one embodiment, a computing system implemented method provides estimated tax refund data to a user of a tax return preparation system. The method includes receiving current user tax related data associated with a user of a tax return preparation system, receiving historical tax related data related to historical users of the tax return preparation system, and generating estimated tax refund data including an estimated tax refund for the user by making probabilistic inferences about a tax situation of the user based on the historical tax related data and the tax rules data related to rules for preparing tax returns. The method also includes providing the estimated tax refund data to the user in a tax return preparation interview.

In one embodiment, a system provides estimated tax refund data to a user of a tax return preparation system. The system includes at least one processor and at least one memory coupled to the at least one processor, the at least one memory having stored therein instructions which, when executed by any set of the one or more processors, perform a process. The process includes receiving current user tax related data associated with a user of a tax return preparation system, generating data values related to a tax return of the user based on the current user tax related data and tax rules data related to procedures for preparing tax returns, and receiving historical tax related data related to previously prepared tax returns of historical users of the tax return preparation system. The process includes identifying a subset of the previously prepared tax returns that include similarities with the current user tax related data, generating probabilistic inference data by analyzing the tax rules data and the historical tax related data associated with the subset of previously prepared tax returns, and generating estimated tax refund data based on the probabilistic inference data and including an estimated tax refund. The process also includes providing the estimated tax refund data to the user in a tax return preparation interview.

In one embodiment, a non-transitory computer-readable medium has a plurality of computer-executable instructions which, when executed by a processor, performs a method for providing estimated tax refund data to a user of a tax return preparation system. The instructions include a user interface module configured to receive current user tax related data associated with a user of a tax return preparation system during a tax return preparation interview. The instructions include an information acquisition module configured to gather historical tax related data related to previously prepared tax returns of historical users of the tax return preparation system. The instructions include an inference engine configured to identify a subset of the previously prepared tax returns that include similarities with the current user tax related data and to generate estimated tax refund data including an estimated tax refund of the user by analyzing tax rules data and the historical tax related data associated with the subset of previously prepared tax returns by generating probabilistic inference data related to one or more probabilistic inferences about the user based on the previously prepared tax returns and the tax rules data. The user interface module is configured to output the estimated tax refund data to the user.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for probabilistically predicting a tax refund range, the system located in a service provider computing environment and comprising:
   one or more processors; and
   at least one memory coupled to the one or more processors and storing instructions that, when executed by the one or more processors, causes the system to perform operations including:
      receiving, via a user interface module in connection with a user device located in a user computing environment, user data associated with a system user;
      transforming the user data into a prediction of the system user's tax refund range based on:
         receiving prior tax return data over a communication network from a system database, the prior tax return data indicating characteristics of prior system users;
         identifying ones of the prior system users sharing at least one characteristic with the system user based on the prior tax return data received from the system database;
         generating, from the user data, tax return data for the system user;
         generating at least one statistical inference about characteristics of the system user based on the identified ones of the prior system users sharing at least one characteristic with the system user and the prior tax return data received from the system database;
         determining, for each respective inference of the at least one statistical inference, a probability that the respective inference is correct based on a probabilistic analysis of the tax return data; and
         in response to at least one of the determined probabilities being greater than a value, generating the prediction of the system user's tax refund range;
      providing, via the user interface module, the system user with the generated prediction;
      continuously refining the generated prediction based on:
         receiving, via the user interface module, additional user data associated with the system user;
         generating additional inferences about characteristics of the system user based on additional prior tax return data;
         determining additional probabilities that the additional inferences are correct based on additional probabilistic analyses; and
         refining the generated prediction based on the additional probabilities; and
      providing, via the user interface module, the system user with the refined prediction.

2. The system of claim 1, wherein the prior tax return data is based on a set of prior tax returns associated with the prior system users, and wherein each of the prior system users is different than the system user.

3. The system of claim 2, wherein execution of the instructions causes the system to perform operations further including:
   determining that the prior system users share at least one characteristic with the system user.

4. The system of claim 1, wherein at least one of the prior system users is the system user.

5. The system of claim 1, wherein execution of the instructions causes the system to perform operations further including:
   identifying a data entry made by the system user having a statistical probability of being correct below a value; and
   indicating that the system user has possibly made an error related to the data entry.

6. The system of claim 1, wherein generating the statistical inferences is based on at least one of a z-score, a logistic function, or a Monte Carlo integration.

7. The system of claim 1, wherein generating the prediction includes:
   identifying an incomplete field among the tax return data;
   identifying one or more prior fields among the prior tax return data corresponding to the incomplete field; and
   determining a statistical distribution of values for the incomplete field based on the one or more prior fields.

8. The system of claim 7, wherein generating the prediction further includes:
   inferring a value for the incomplete field from the statistical distribution of values, wherein the inferred value is used to generate the prediction of the system user's tax refund range.

9. The system of claim 1, wherein the generated tax refund range falls within a standard deviation of a median tax refund associated with a subset of prior users.

10. A method for probabilistically predicting a tax refund range, the method performed by one or more processors of a system and comprising:
    receiving, via a user interface module in connection with a user device located in a user computing environment, user data associated with a system user;
    transforming the user data into a prediction of the system user's tax refund range based on:
       receiving prior tax return data over a communications network from a system database, the prior tax return data indicating characteristics of prior system users;
       identifying ones of the prior system users sharing at least one characteristics with the system user based on the prior tax return data received from the system database;
       generating, from the user data, tax return data for the system user;
       generating at least one statistical inference about characteristics of the system user based on the identified ones of the prior system users sharing at least one characteristic with the system user and the prior tax return data received form the system database;
       determining, for each respective inference of the at least one statistical inference, a probability that the respective inference is correct based on a probabilistic analysis of the tax return data; and
       in response to at least one of the determined probabilities being greater than a value, generating the prediction of the system user's tax refund range;
    providing, via the user interface module, the system user with the generated prediction;
    continuously refining the generated prediction based on:
       receiving, via the user interface module, additional user data associated with the system user;
       generating additional inferences about characteristics of the system user based on additional prior tax return data;

determining additional probabilities that the additional inferences are correct based on additional probabilistic analyses; and refining the generated prediction based on the additional probabilities; and providing, via the user interface module, the system user with the refined prediction.

11. The method of claim 10, wherein the prior tax return data is based on a set of prior tax returns associated with the prior system users, and wherein each of the prior systems users is different than the system user.

12. The method of claim 11, further comprising:
determining that the prior system users share at least one characteristic with the system user.

13. The method of claim 10, wherein at least one of the prior system users is the system user.

14. The method of claim 10, further comprising:
identifying a data entry made by the system user having a statistical probability of being correct below a value; and indicating that the system user has possibly made an error related to the data entry.

15. The method of claim 10, wherein generating the statistical inferences is based on at least one of a z-score, a logistic function, or a Monte Carlo integration.

16. The method of claim 10, wherein generating the prediction includes:
identifying an incomplete field among the tax return data;
identifying one or more prior fields among the prior tax return data corresponding to the incomplete field; and
determining a statistical distribution of values for the incomplete field based on the one or more prior fields.

17. The method of claim 16, wherein generating the prediction further includes:
inferring a value for the incomplete field from the statistical distribution of values, wherein the inferred value is used to generate the prediction of the system user's tax refund range.

18. The method of claim 10, wherein the generated tax refund range falls within a standard deviation of a median tax refund associated with a subset of prior users.

19. A non-transitory computer-readable medium storing instructions that, when executed by one or more processors of a system, causes the system to perform operations comprising:

receiving, via a user interface module in connection with a user device located in a user computing environment, user data associated with a system user;

transforming the user data into a prediction of the system user's tax refund range based on:
receiving prior tax return data over a communications network from a system database, the prior tax return data indicating characteristics of prior system users;
identifying ones of the prior system users sharing at least one characteristic with the system user based on the prior tax return data received from the system database;
generating, from the user data, tax return data for the system user;
generating at least one statistical inference about characteristics of the system user based on the identified ones of the prior system users sharing at least one characteristic with the system user and the prior tax return data received from the system database;
determining, for each respective inference of the at least one statistical inference, a probability that the respective inference is correct based on a probabilistic analysis of the tax return data; and
in response to at least one of the determined probabilities being greater than a value, generating the prediction of the system user's tax refund range;

providing, via the user interface module, the system user with the generated prediction;

continuously refining the generated prediction based on:
receiving, via the user interface module, additional user data associated with the system user;
generating additional inferences about characteristics of the system user based on additional prior tax return data;
determining additional probabilities that the additional inferences are correct based on additional probabilistic analyses; and
refining the generated prediction based on the additional probabilities; and providing, via the user interface module, the system user with the refined prediction.

20. The computer-readable medium of claim 19, wherein the prior tax return data is based on a set of prior tax returns associated with the prior system users, and wherein each of the prior system is different than the system user.

* * * * *